US006941418B1

(12) United States Patent
Goolsby

(10) Patent No.: US 6,941,418 B1
(45) Date of Patent: Sep. 6, 2005

(54) INTEGRATED CIRCUIT AND METHOD OUTPUTTING DATA

(75) Inventor: Jeremy B. Goolsby, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 288 days.

(21) Appl. No.: 10/421,487

(22) Filed: Apr. 22, 2003

(51) Int. Cl.[7] .............................................. G06F 12/00
(52) U.S. Cl. ........................................ 711/109; 712/35
(58) Field of Search ........................ 711/109, 118, 119; 712/35; 710/52, 34

(56) References Cited

U.S. PATENT DOCUMENTS 5,519,345 A * 5/1996 Farrell et al. ................ 327/108
5,831,467 A * 11/1998 Leung et al. ................ 327/319
5,954,811 A * 9/1999 Garde ........................... 712/35
6,212,591 B1 * 4/2001 Kaplinsky .................... 710/305
6,848,042 B1 * 1/2005 Campbell et al. ............. 712/35

* cited by examiner

Primary Examiner—Hiep T. Nguyen
(74) Attorney, Agent, or Firm—John King

(57) ABSTRACT

A circuit according to an embodiment of the present invention can load data in parallel to a barrel shifter, and output data to a pipelined multiplexer stage. The multiplexer is used to direct data from predetermined barrel slots to a predetermined number of output data slots. A control logic circuit will determine which of the barrel shifter entries are the oldest, and will drive the selects of the multiplexer to direct them to the output. The second stage of the multiplexer will drive the four 16-bit outputs to generate the 64-bit user data path. Methods for implementing the embodiments of the invention are also disclosed.

40 Claims, 6 Drawing Sheets

INTEGRATED CIRCUIT AND METHOD OUTPUTTING DATA

FIELD OF THE INVENTION

The present invention relates generally to integrated circuits, and in particular, to an integrated circuit having a first-in first out (FIFO) circuit, and a method of outputting data from a FIFO circuit.

BACKGROUND OF THE INVENTION

As electronic devices and systems continue to evolve, their operating speeds continue to increase. However, some components of such devices and systems may operate at a lower speed, and therefore may not be compatible with, or may limit, high speed devices or systems. Because of the high data rates of many networking applications, it may be necessary to multiplex the input data words operating at a high frequency into a larger data word, comprised of several smaller data words, operating at a lower frequency.

One conventional networking standard which enables the development of interoperable products and services for data switching and routing using optical networking technologies provides an example in which this multiplexing must be done. In this networking standard, for example, the interface data bus is 16-bits wide and operates dual-data-rate (DDR) at up to 500 MHz. In order to internally process that data in a device operating at a lower speed, it is necessary to multiplex that data into an internal format of a wider parallel bus operating at a lower clock frequency (i.e. 64-bits at 250 MHz). Conversely, when writing data out, it is necessary convert the data from the internal parallel bus at the lower frequency to the external 16-bit dual-data-rate format at the higher frequency. In this standard, between one and nine 16-bit data words may be written into the memory per clock cycle. Because of the multiplexing necessary to send one 16-bit DDR word at 500 MHz, the internal logic must read four 16-bit words from memory per 250 MHz clock cycle.

However, there is not a straight conversion between the data buses. The received data contains headers that must be separated from the raw data payloads. After stripping headers, some number of data words are passed on to the user. Further, the data may be too much to place on the user bus at once. A conventional approach could be to predict the various combinations of input words that could occur, and create logic to assemble four or less output data words from these combinations. Although shift registers have been used to implement FIFOs, they normally only shift by +1. A large array of complex logic would be needed to create a FIFO to generate the fixed output data to enable the conversion between the data buses.

Accordingly, there is a need for an improved integrated circuit and method of outputting data from a FIFO which can operate at a lower clock rate and read or write data at a higher clock rate.

SUMMARY OF THE INVENTION

The integrated circuit and method of embodiments of the present invention enable receiving a variable number of input data words, and will output a constant number of output data words. According to one embodiment of the present invention, a variable input fixed output buffer (VI-FOB) will permit the logic driving the inputs to indicate how many 16-bit words it is simultaneously inputting. When words are present in the buffer, the VIFOB will push as many as four of the oldest words out to the output logic (for example, in a system receiving up to nine input words). If four words are not available, it can either send out the data and place idles on the unused outputs, or hold the data until enough data is available. Accordingly, the VIFOB effectively frees the parsing logic which creates the input words from having to compact the words into constant four word sized chunks.

According to one embodiment of the invention, a type of barrel shifter is employed along with pipelined multiplexer stages and corresponding control logic. Unlike a conventional barrel shifter which will shift data a variable number of times, a circuit according to an embodiment of the present invention can load data in parallel, with between zero and nine 16-bit words placed into a barrel shifter having twelve slots in one cycle, for example. The output of the barrel shifter is preferably coupled to the pipelined multiplexer stage. That is, because a large multiplexer is needed to perform the outputting of a fixed number of data bits from a large number of barrel slots of the barrel shifter, the pipelined multiplexer is broken into multiple stages to improve timing. The pipelined multiplexer is used to direct data from predetermined barrel slots to the four output data slots. A control logic circuit will determine which of the barrel shifter entries are the oldest, and will drive the selects of the multiplexer to direct them to the output. The second stage could drive the four 16-bit outputs to generate the 64-bit user data path, for example.

DETAILED DESCRIPTION OF THE DRAWINGS

Figure 1:
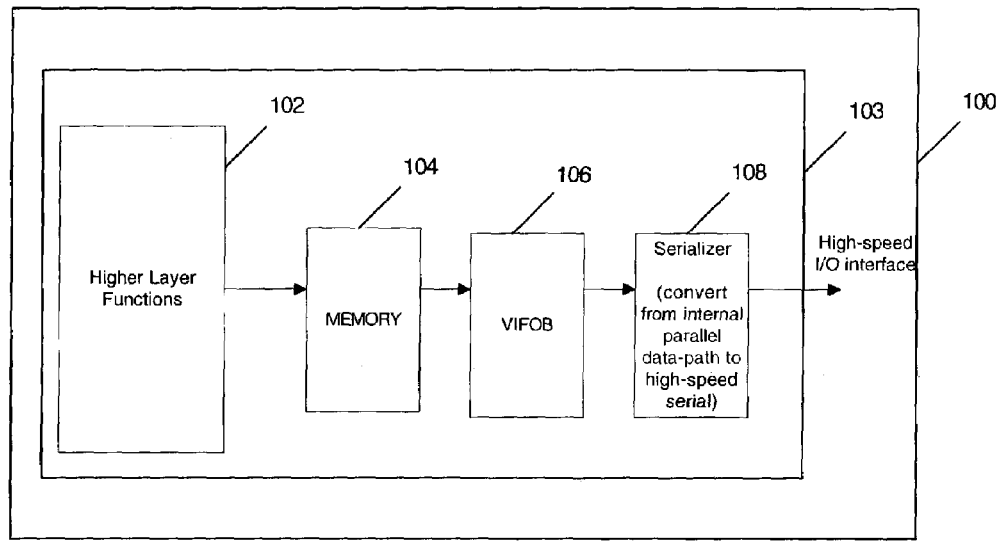
FIG. 1 is a block diagram of an embodiment of an integrated circuit employing the present invention.
Figure 2:
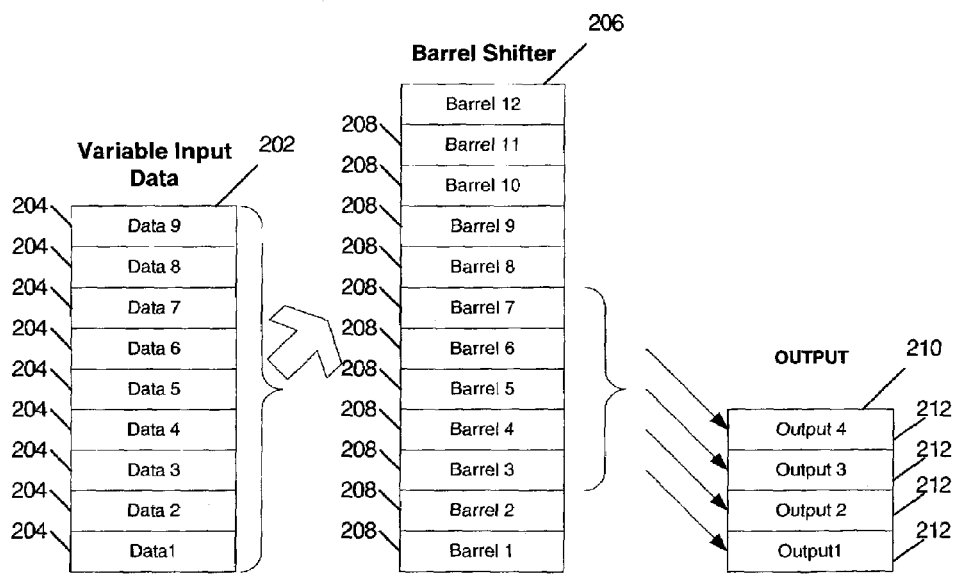
FIG. 2 is a block diagram of a FIFO system according to an embodiment of the present invention.

Turning first to FIG. 1, a block diagram shows a device 100 employing an embodiment of the present invention. In particular, a high layer function block 102 comprises conventional functions of an integrated circuit 103 having a memory 104. Such integrated circuits could include a field programmable gate array (FPGA), complex programmable logic device (CPLD), or any other logic device, memory device or processing device incorporating a FIFO. Generally, the high layer functions block 102 provides control signals, such as read and write requests to the memory 104.

The memory 104 is coupled to a variable input fixed output buffer (VIFOB) block 106. The VIFOB 106 provides data alignment for high speed data output, as will be described in more detail below. Finally, the data is provided to a serializer 108 which converts internal parallel path data to high speed serial data. For example, the serializer 108 could convert a sixty-four bit word read from the memory read at a clock rate of 250 MHz to four sixteen bit words at 500 MHz. The output of the serializer 108 is provided to the device 100. The device 100 could be any electronic device or system incorporating a memory element.

As will be described in more detail below, the VIFOB allows multiple data words to be written per clock cycle and allows a constant number of data words to be read per clock cycle. The VIFOB also shifts data internally such that no gaps appear between words. The VIFOB allows the width of the data written into the input port to change dynamically while a fixed width data word is read each clock cycle. The VIFOB automatically aligns the data so that it can be continuously accessed with no discontinuities.

Turning now to FIGS. 2 and 3a–3c, block diagrama show the operation of the VIFOB 106 according to an embodiment of the present invention. Data is input to variable length data block 202 having a number of data slots 204. The data is then provided to a FIFO comprising a barrel shifter 206 having a plurality of barrel slots 208. The barrel slots of the barrel shifter 206 are preferably implemented in registers to enable the shifting of data. The operation of the barrel shifter 206 will be described in more detail in reference to FIGS. 3a–3c and 4. A predetermined number of oldest data words in barrels 208 are provided to an output register 210 having a corresponding number of output slots 212.

Figure 3A:
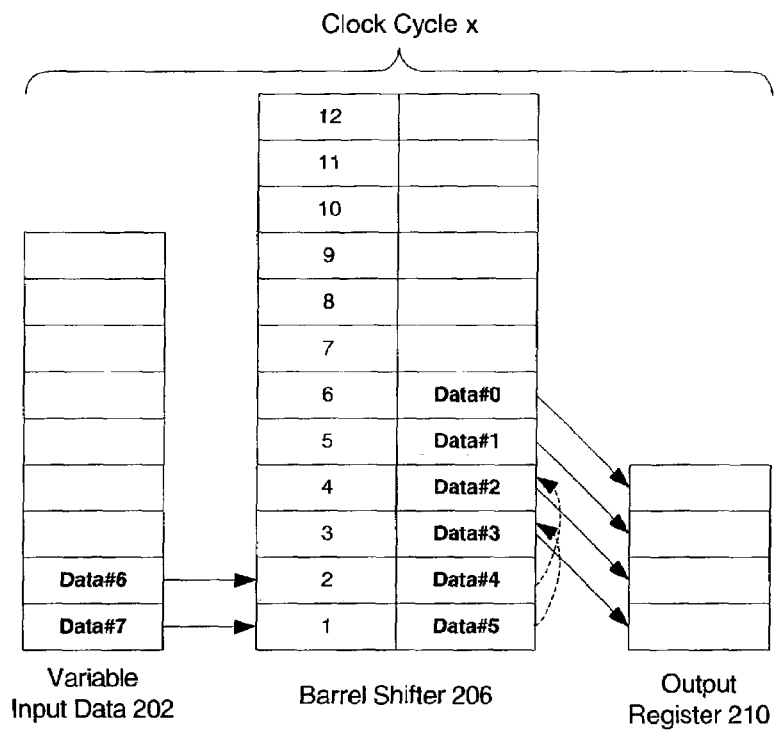
FIGS. 3a–3c are block diagrams showing the operation of the FIFO circuit of FIG. 2 according to an embodiment of the present invention.
Figure 3B:
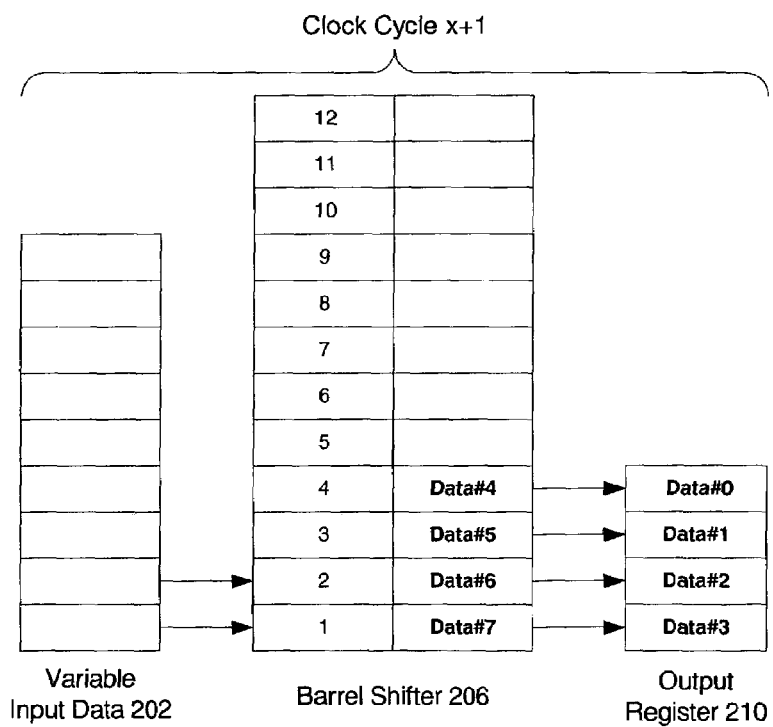
Figure 3C:
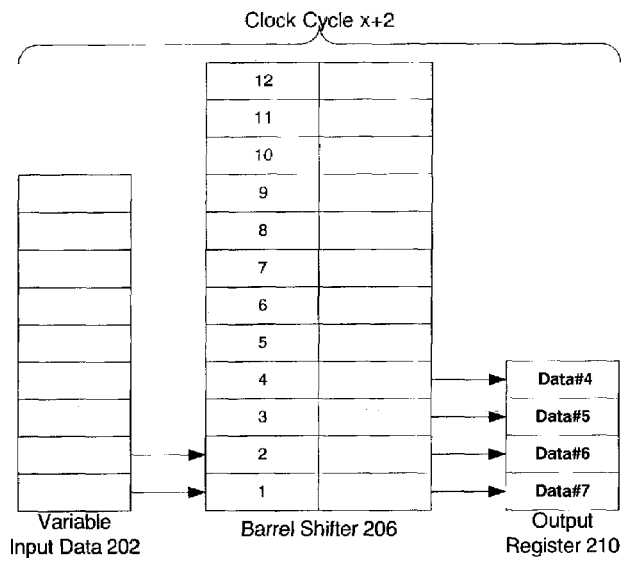

An example of the operation of the VIFOB 206 is depicted in FIGS. 3a–3c where eight words (i.e. data#0 to data#7) are to be shifted out. The barrel shifter 206 has six data words (i.e. data#0 to data#5) and is about to receive two more. Since the barrel shifter has more than four words, the four oldest entries (i.e. data #0,#1,#2,#3) will be selected to be passed to the output. The two remaining entries (data #4,#5) will be shifted by two to make room for the two new input words (i.e. data#6 and data#7). On clock cycle x+1, the barrel shifter 206 has four data words in it (i.e. data#4, data#5, data#6, data#7) and will not receive any more data words, as shown in FIG. 3b. It has just clocked data #0 through #3 into the output stage. Since the FIFO has four words in it now, the four oldest entries (data#4, data#5, data#6, data#7) will be selected to be passed to the output. On clock cycle x+2, data#4 through data#7 is clocked into the output stage, as shown in FIG. 3c.

Figure 4:
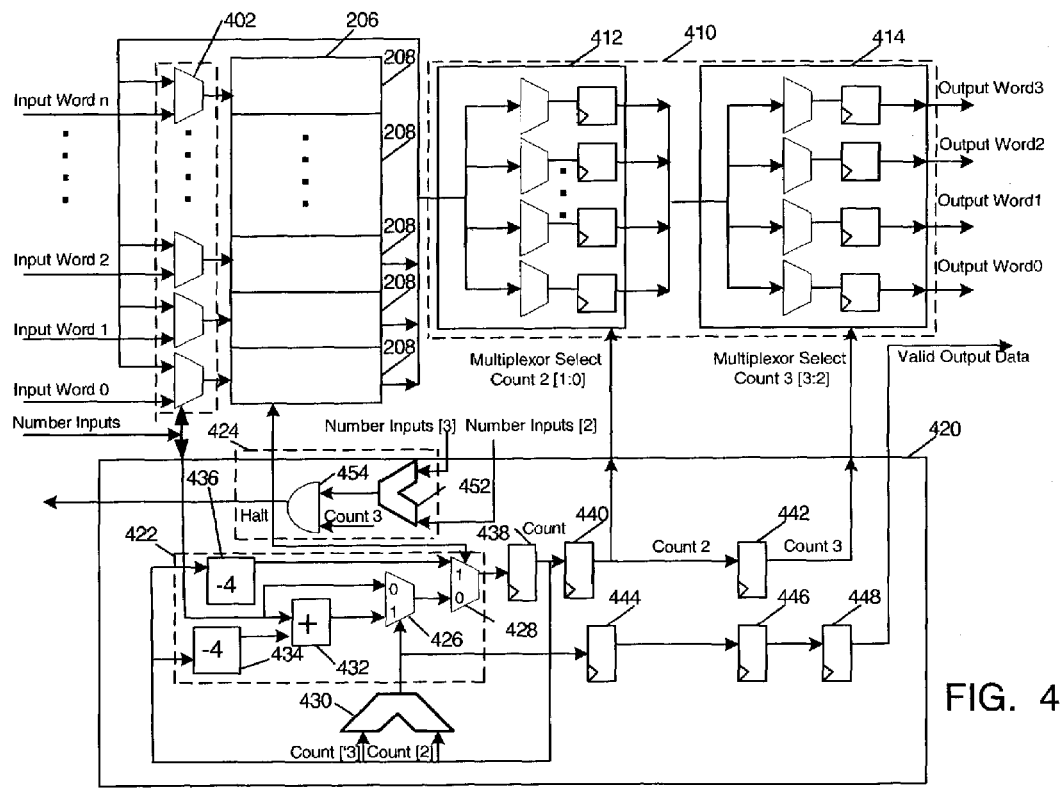
FIG. 4 is a block diagram of a circuit for outputting data according to an embodiment of the present invention.

Turning now to FIG. 4, a block diagram of a circuit for outputting data according to an embodiment of the present invention is shown. In particular, a multiplexer block 402 comprising a plurality of multiplexers receives input data words. Any data entering the module (Input_Word0, Input_Word1, . . . , Input_Wordn) is expected to be aligned to corresponding barrels of the barrel shifter 206. For instance, if there are three words coming in, they will occupy the lower three barrel slots; if there are two words, then they will occupy the lower two barrel slots of the barrel shifter. The number of words that are being loaded into the barrel shifter is reported on Number_Inputs. If Number_Inputs has a non-zero value, then the valid inputs are loaded into the corresponding entries in the barrel shifter. At the same time, all entries currently in the barrel shifter are shifted upward by the same amount to prevent being overwritten by the newly written words. The outputs of multiplexer block 402 are coupled to barrel slots 208 of barrel shifter 206. The output of barrel shifter 206 is coupled to a pipelined multiplexer 410 comprising a first stage 412 and a second stage 414. The pipelined multiplexer generates a plurality of output words, as will be described in more detail in reference to FIG. 5.

A control logic circuit 420 is also coupled to the barrel shifter 206 and the pipeline multiplexer 410. When the barrel shifter is loaded with new data, there must be a counter to account for how many of the barrel shifter slots have been occupied (i.e., a barrel count). This counter is then used to prevent an overflow and to determine the location of the oldest entries to send out. Therefore the counter will count up by Number_Inputs, and will count down by 4 if Count$\geq$4. It should be noted that it may need be necessary to perform these operations simultaneously if the barrel shifter is loading input words at the same time it is taking them out. If Count is about to exceed the number of barrel shifter entries m (where, for example, m=12 in FIGS. 3a–3c), then the control logic circuit must issue a Halt signal back to the sourcing logic to indicate that it will not take the next batch of input data words. The inputs are preferably held until the barrel shifter can take it.

The control logic circuit preferably implements the following equation to generate a Count, i.e., a barrel count, according to one aspect of the present invention:

If ((Number_Inputs+Count−4)>m) then
   Halt=1;
   Count=Count−4;
Else
If (Count$\geq$24)
   Halt=0
   Count=Count+Number_Inputs−4;
Else
   Halt=0
   Count=Count+Number_Inputs;

The first "if" branch determines if there is about to be an overflow of the barrel shifter. The equation determines if the number of data words coming in (Number_Inputs) plus the Count minus the number of data words going out (e.g. 4 in this case where there are four output data slots) will exceed the total size of the barrel shifter (m). If the barrel shifter is going to overflow, then the control logic issues a Halt and decrements the Count by 4 (since there are 4 items to send out). The second "if" branch is similar to the first except that it is known at this point that there is no need to halt the input of data, and therefore the Number_Inputs can be added into the Count value. The last "else" branch is used in case the second branch did not have a Count of at least 4. Because the barrel shifter preferably waits to accumulate 4 words so that compacted data can be sent, the next value of Count is simply the Count+Number_Inputs. If a minimum threshold of data is not met, then Valid_Output_Data will go inactive 2 cycles later to account for the pipeline delay.

In order to implement the equation listed above, the control logic circuit 420 comprises a count generator 422 having a first multiplexer 426 (establishing Count=Count-4 if Halt equals 1) and a second multiplexer 428 (establishing Count if Halt equals 0). The first multiplexer 426 is coupled to receive a control signal from a comparator 430 which compares bits of the count to determine if Count is greater than or equal to 4. That is, the comparator will compare bits [2] and [3] of Count. The output of the comparator 430 is coupled to enable the multiplexer 426. An adder 432 receives the Number Inputs signal and the count minus four signal. The adder provides the sum to the multiplexer 426. The Number Inputs signal is also separately provided to the multiplexer 426. The output of the multiplexer 426 is coupled to the multiplexer 428. Finally, the count minus four is also coupled to the multiplexer 428. The output of the multiplexer 428 is coupled to a buffer 438 which generates the count signal. The count signal is coupled to a second buffer 440 which generates a Count 2 signal, and a buffer 442 which generates a Count 3 signal. The function of the Count 2 and Count 3 signals (which are coupled to the pipelined multiplexer 410) will be described in more detail in reference to FIG. 5.

The output of the comparator 430 is also coupled to a delay circuit comprising a plurality of registers 444, 446 and 448. The output of register 448 is a valid output data signal. As described above, the valid output data is generated based upon whether there is enough data to provide a continuous data to the output register 210. Finally, the halt circuit 424 comprises a comparator 452 comparing the Number Inputs [2] and Number Inputs [3] (to determine if the number of inputs is greater than 3), and generates an output signal to an AND gate 454. The AND gate also receives Count 3 (to determine if the Count is greater than 7) and generates a halt signal. The halt signal is coupled to the FIFO 202 and the multiplexer 422. A valid halt signal will be generated if the number of input data words would cause the FIFO to overflow as described above.

The halt circuit 424 of FIG. 4 provides a simplified circuit which eliminates unnecessary inputs than would be required to determine if Number Inputs+Count-4>m. If the barrel shifter has 12 entries, then the following could be used to generate the Halt condition: ((Number_Inputs>3) and (Count>7)). One advantage of the embodiment of halt circuit 424 is that there is no comparison to m, which is 4 bits (if m=12), and there is no addition or subtraction. Further, a total of only 3 bits is needed to implement this function.

The condition that Count>7 will ensure that there are always at least 8 words in the barrel shifter, which is enough to ensure the next cycle will not be interrupted before data is halted. That is, if the halt circuit generated a Halt signal when Count was equal to 7, then the current 4 data words would be sent out, and there would be only 3 data words left to send out next cycle since the Halt would have disabled further writes to the barrel shifter. An extreme of this equation occurs when Number_Inputs is at its maximum (i.e. 9) and Count=7. As is apparent, the number of inputs (i.e. 9) plus the greatest previous count (i.e. 7) minus the number of words sent out (i.e. 4) is not greater than the number of barrel shifter entries (i.e. 12).

Figure 5:
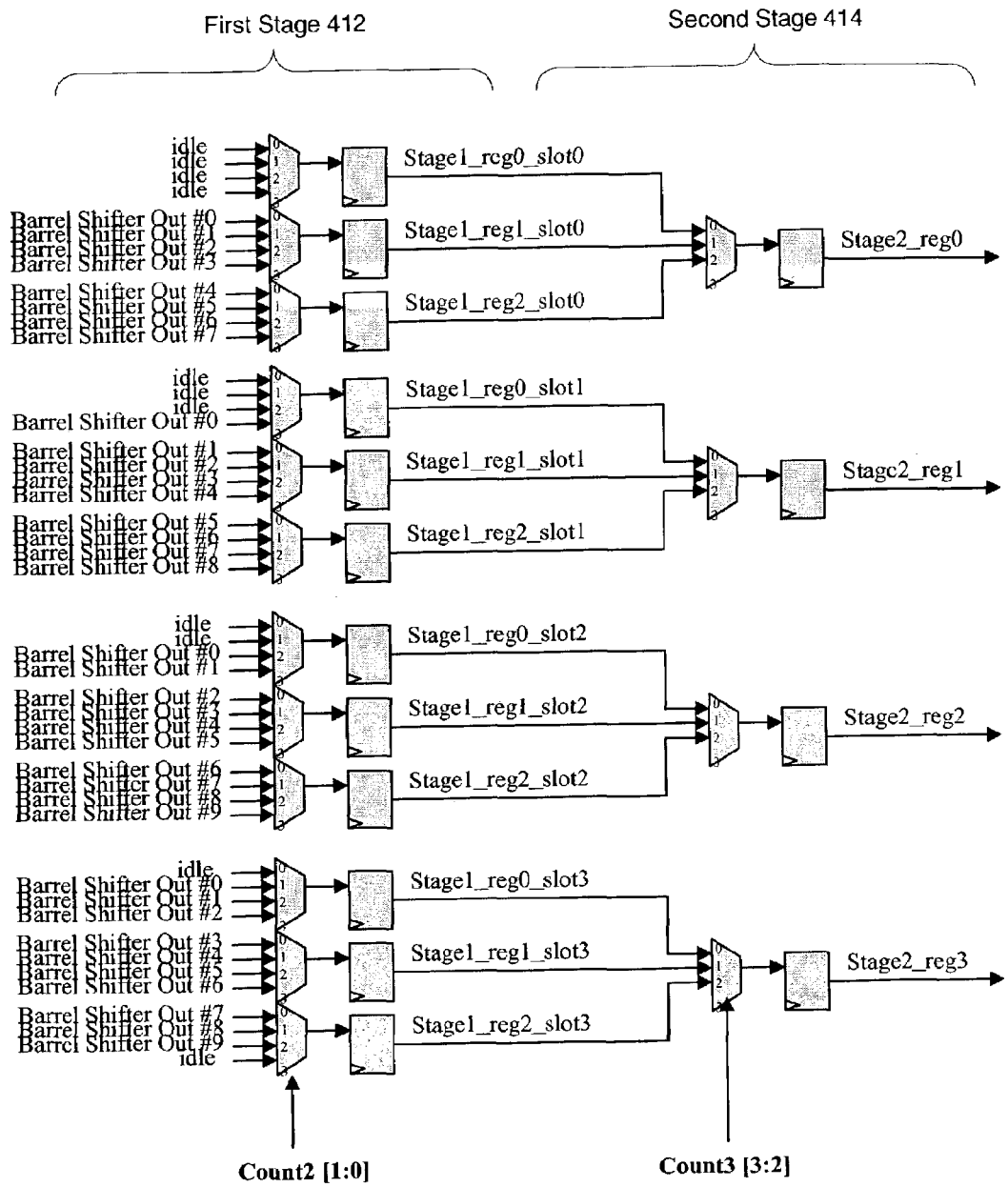
FIG. 5 is a circuit diagram of the pipelined multiplexer 410 of FIG. 4 according to an embodiment of the present invention.

Turning now to FIG. 5, a block diagram shows the pipelined multiplexer 410 of FIG. 4 in more detail. In particular, the first stage will select the outputs of the barrel shifter based on the lower 2 bits of the first pipelined version of Count (i.e. Count2), and the second stage will select the outputs of the first stage based on the upper 2 bits of the second pipelined version of Count (i.e. Count3).

The operation of the pipelined multiplexer 410 is best understood by way of example. Using Count=7, for example, one clock cycle after this Count becomes valid, Count2 will contain "7" (=0111 in binary), and it will use the lower bits of "11" (=3 in decimal) to make a selection. It will load the "Stage1" registers with the #3 mux inputs, which is (reading from the top of the Figure, starting with "Stage1_reg0_slot0"): idle,3,7; 0,4,8; 1,5,9; 2,6,idle. On the next clock cycle, Count3 will contain "7" and it will use the upper bits of "01" (=1 in decimal) to make a selection. It will load the "Stage2" registers with the #1 mux inputs, which is (using the second entry of each triplet in the previous list): 3,4,5,6. This is precisely what is expected to be passed to the output for a Count of "7" (4 oldest entries). The outputs for other values of Count could be determined in a similar manner.

Figure 6:
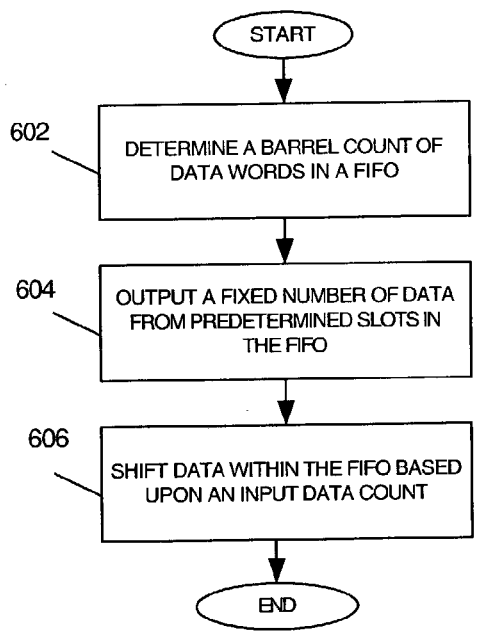
FIG. 6 is a flow chart showing a method of outputting a fixed number of data words according to an embodiment of the present invention.

Turning now to FIG. 6, a flow chart shows a method of outputting a fixed number of data words according to an embodiment of the present invention. In particular, a barrel count of data words in a FIFO is determined at a step 602. A fixed number of data is output from predetermined slots in the FIFO at a step 604. Data is then shifted within the FIFO based upon an input data count at a step 606.

Figure 7:
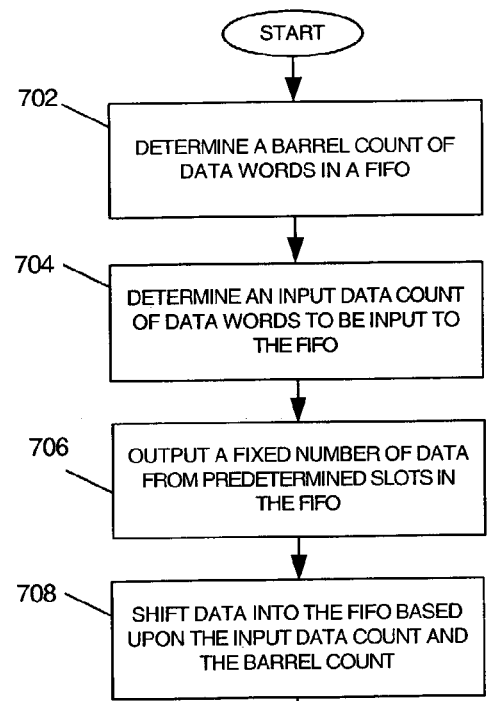
FIG. 7 is a flow chart showing a method of shifting data words into a FIFO based upon an input data count and barrel count according to an embodiment of the present invention.

Turning now to FIG. 7, a flow chart shows a method of shifting data words into a FIFO based upon an input data count and barrel count according to an embodiment of the present invention. In particular, a barrel count of data words in a FIFO is determined at a step 702. An input count of data words to be input to the FIFO is determined at a step 704. A fixed number of data words is output from predetermined slots in the FIFO at a step 706. Finally, data is shifted into the FIFO based upon the input data count and barrel count at a step 708.

Figure 8:
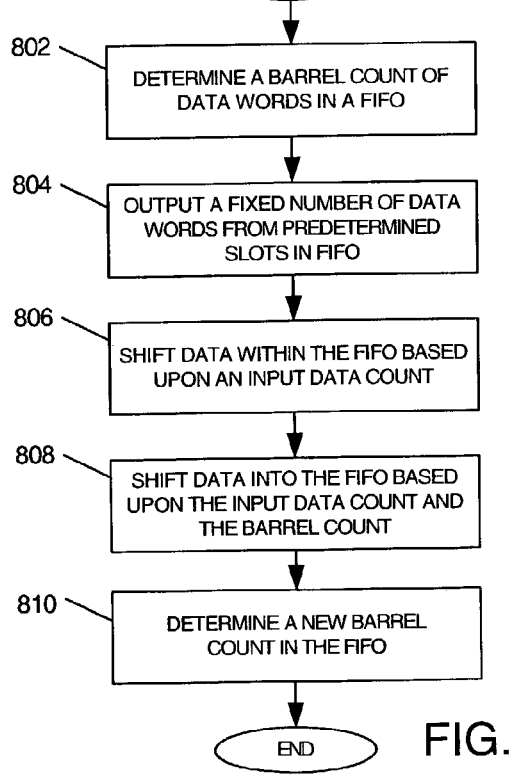
FIG. 8 is a flow chart showing a method of shifting data within a FIFO according to an embodiment of the present invention.

Turning now to FIG. 8, a flow chart shows a method of shifting data within a FIFO according to an embodiment of the present invention. In particular, a barrel count of data words in a FIFO is determined at a step 802. A fixed number of data words from predetermined slots in the FIFO are output at a step 804. Data is shifted within FIFO based upon an input data count at a step 806. Data is shifted into the FIFO based upon the input data count and the barrel count at a step 808. Finally, a new barrel count of data in the FIFO is determined at a step 810.

Figure 9:
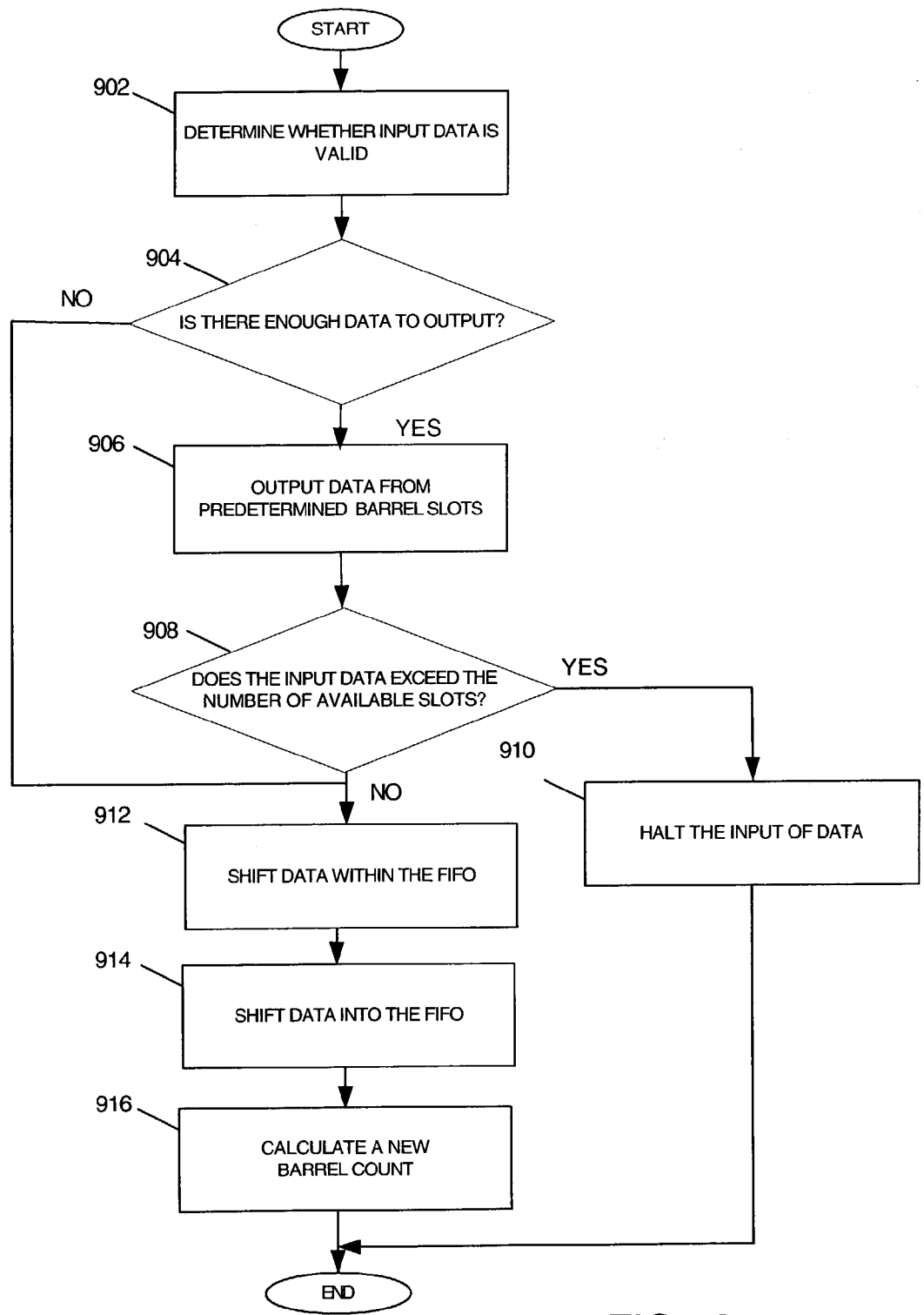
FIG. 9 is a flow chart showing a method of outputting data according to an embodiment of the present invention.

Turning now to FIG. 9, a flow chart shows a method of the operation of outputting data according to an embodiment of the present invention. In particular, it is determined whether input data is valid at a step 902. It is then determined whether there is enough data in FIFO at a step 904. That is, it may be desirable to hold data until enough data is available to generate a constant output of data words from the FIFO. If so, data is output from predetermined barrel slots based upon the barrel count at a step 906. It is determined whether the input data exceeds the number of available slots at a step 908. That is, it is determined if the input data would cause the FIFO to overflow based upon the current barrel count, the number of input data words and the amount of output data words. If so, the input of data is halted at a step 910. If not, data is shifted within the FIFO at a step 912. Input data words are then shifted into output barrel slots at a step 914. Finally, a new barrel count is then calculated based upon the previous barrel count, the number of data words which are output, and/or the number of input words at a step 916.

It can therefore be appreciated that the new and novel integrated circuit and method of outputting data from a FIFO has been described. It will be appreciated by those skilled in the art that, particular the teaching herein, numerous alternatives and equivalents will be seen to exist which incorporate the disclosed invention. As a result, the invention is not to be limited by the foregoing embodiments, but only by the following claims.

What is claimed is:

1. A method of outputting data from a FIFO incorporated in an integrated circuit, said method comprising the steps of:
   determining a barrel count of data in said FIFO;
   outputting a fixed number of data words from predetermined slots of said FIFO based upon said barrel count;
   shifting data within said FIFO based upon an input data count of data words to be input to said FIFO; and
   shifting data into said FIFO based upon said input data count.

2. The method of claim 1 wherein said step of outputting a fixed number of data words from predetermined slots of said FIFO comprises outputting a fixed number of data words having a fixed length.

3. The method of claim 1 wherein said step of outputting a fixed number of data words from predetermined slots of said FIFO comprises outputting data if at least a predetermined number of data words are present within said FIFO.

4. The method of claim 1 wherein said shifting data within said FIFO is further based upon said barrel count.

5. The method of claim 1 further comprising a step of determining whether said FIFO has available data slots to receive said input data words.

6. The method of claim 5 further comprising a step of halting the input of said data words if said input data count would exceed a number of available data slots in said FIFO after said step of outputting a fixed number of data words from predetermined barrel slots.

7. The method of claim 1 further comprising a step of determining a new barrel count based upon said step of shifting data into said FIFO.

8. A method of outputting data from a FIFO incorporated in an integrated circuit, said method comprising the steps of:
determining a barrel count of data words in said FIFO;
determining an input data count of data words to be input to said FIFO;
outputting a fixed number of data words from predetermined barrel slots based upon said barrel count; and
shifting data into said FIFO based upon said input data count and said barrel count.

9. The method of claim 8 further comprising a step of determining if said input data count exceeds a number of available slots in said FIFO after said step of outputting a fixed number of data words from predetermined data slots.

10. The method of claim 9 further comprising a step of establishing a new barrel count equal to said barrel count minus a number of output words if said input data count would exceed a number of available slots in said FIFO after said step of outputting a fixed number of data words from predetermined barrel slots.

11. The method of claim 9 further comprising a step of halting the input of data words if said input data count would exceed a number of available slots in said FIFO after said step of outputting a fixed number of data words from predetermined barrel slots.

12. The method of claim 9 further comprising a step of determining if said barrel count is greater than or equal to a number of output words when said input data count does not exceed a number of available slots in said FIFO after said step of outputting a fixed number of data words from predetermined barrel slots.

13. The method of claim 12 further comprising a step of establishing a new barrel count equal to said barrel count minus a number of output words when said barrel count is greater than or equal to said number of output words.

14. The method of claim 12 further comprising a step of establishing a new barrel count equal to said barrel count plus a number of input words when said barrel count is less than said number of output words.

15. A method of outputting data from a FIFO incorporated in an integrated circuit, said method comprising the steps of:
determining a barrel count of data in said FIFO during a first clock cycle;
outputting a fixed number of data words from predetermined slots of said FIFO based upon said barrel count during a second clock cycle;
shifting data within said FIFO based upon an input count of data to be input to said FIFO during said second clock cycle;
shifting data into said FIFO based upon said input data and said barrel count during said second clock cycle; and
determining a new barrel count based upon said step of shifting data into said FIFO.

16. The method of claim 15 wherein said step of outputting a fixed number of data words from predetermined slots of said FIFO comprises outputting a fixed number of data words having a fixed length.

17. The method of claim 15 further comprising a step of determining said input data count of data words to be input said FIFO.

18. The method of claim 17 wherein said step of shifting data within said FIFO comprises shifting data based upon said barrel count.

19. The method of claim 15 further comprising a step of determining if said number of input data words to said FIFO would exceed a number of available slots in said FIFO after said step of outputting a fixed number of data words from predetermined slots.

20. The method of claim 19 further comprising a step of halting the input of said data words if said number of said input data words would exceed said number of available slots in said FIFO.

21. An integrated circuit incorporating a FIFO, said integrated circuit comprising:
a barrel shifter coupled to receive a variable number of input data words;
an output multiplexer coupled to said barrel shifter and having a first stage and a second stage, said output multiplexer outputting a fixed number of data words; and
control logic coupled to said barrel shifter and said output multiplexer, said control logic generating a multiplexer select signal based upon a barrel count for said FIFO.

22. The integrated circuit incorporating a FIFO of claim 21 wherein said first stage of said output multiplexer comprises a plurality of multiplexers, each said multiplexer of said first stage being coupled to receive predetermined inputs from said barrel shifter.

23. The integrated circuit incorporating a FIFO of claim 22 wherein each said multiplexer of said plurality of multiplexers of said first stage are coupled to receive a first portion of said multiplexer select signal.

24. The integrated circuit incorporating a FIFO of claim 23 wherein said second stage of said pipelined multiplexer comprises a plurality of multiplexers, each said multiplexer of said second stage being coupled to receive predetermined inputs from said barrel shifter.

25. The integrated circuit incorporating a FIFO of claim 24 wherein each said multiplexer of said plurality of multiplexers of said second stage are coupled to receive a second portion of said multiplexer select signal.

26. The integrated circuit incorporating a FIFO of claim 21 further comprising a plurality of multiplexers coupled to said barrel shifter and enabling said plurality of input words to be input to said barrel shifter.

27. The integrated circuit incorporating a FIFO of claim 26 wherein said plurality of multiplexers coupled to said barrel shifter further enables data words to be shifted within said barrel shifter.

28. The integrated circuit incorporating a FIFO of claim 21 further comprising a halting circuit coupled to said barrel shifter.

29. The integrated circuit incorporating a FIFO of claim 28 wherein said halting circuit generates a halting signal based upon a count in said barrel shifter and a number of input data words.

30. An integrated circuit incorporating a FIFO, said integrated circuit comprising:
- a barrel shifter coupled to receive a plurality of input data words;
- control logic coupled to said barrel shifter, said control logic generating an updated barrel count based upon a number of input data words and generating a halt signal based upon said number of input data words; and
- an output circuit coupled to said barrel shifter and said control circuit, said output circuit outputting a fixed number of data words.

31. The integrated circuit incorporating a FIFO of claim 30 wherein said control logic generates a valid halt signal if said number of input data words would exceed a number of available barrel slots in said barrel shifter.

32. The integrated circuit incorporating a FIFO of claim 30 wherein said control logic generates a multiplexer select signal coupled to said output circuit.

33. The integrated circuit incorporating a FIFO of claim 32 wherein said multiplexer select signal comprises a first portion coupled to a first stage of said output circuit.

34. The integrated circuit incorporating a FIFO of claim 32 wherein said multiplexer select signal comprises a second portion coupled to a second portion of said output circuit.

35. The integrated circuit incorporating a FIFO of claim 30 wherein said fixed number of data words comprise data words having a fixed length.

36. The integrated circuit incorporating a FIFO of claim 30 further comprising a valid output data signal output from said control logic.

37. An integrated circuit incorporating a FIFO, said integrated circuit comprising:
- a variable number of input data words;
- a barrel shifter coupled to receive said variable number of input data words;
- an output multiplexer coupled to said barrel shifter and having a first stage and a second stage;
- control logic coupled to said barrel shifter and said output multiplexer, said control logic generating a multiplexer select signal based upon a barrel count for said FIFO;
- a halting circuit coupled to said barrel shifter; and
- a plurality of outputs having a fixed number of data words.

38. The integrated circuit incorporating a FIFO of claim 37 wherein said halting circuit receives a signal indicating a number of data words to be input to said FIFO.

39. The integrated circuit incorporating a FIFO of claim 37 wherein said halting circuit generates a halt signal based upon said number of data words to be input to said FIFO and a barrel count.

40. An integrated circuit incorporating a FIFO, said integrated circuit comprising:
- a variable number of input data words;
- a barrel shifter having a plurality of barrel slots coupled to receive said variable number of input data words;
- a pipelined multiplexer coupled to said barrel shifter and having a first stage and a second stage;
- control logic coupled to said barrel shifter and said pipelined multiplexer, said control logic generating a multiplexer select signal based upon a barrel count for said FIFO;
- a halting circuit coupled to said barrel shifter, said halting circuit receiving a signal indicating a number of data words to be input to said FIFO and generating a halt signal based upon said number of data words to be input to said FIFO and said barrel count; and
- a plurality of outputs having a fixed number of data words.

* * * * *